Nov. 9, 1937.  E. H. LEWIS  2,098,646
EDUCATIONAL APPARATUS
Filed Aug. 8, 1935   2 Sheets-Sheet 1

INVENTOR
Ervin H. Lewis
BY
ATTORNEY

Nov. 9, 1937.  E. H. LEWIS  2,098,646
EDUCATIONAL APPARATUS
Filed Aug. 8, 1935  2 Sheets—Sheet 2
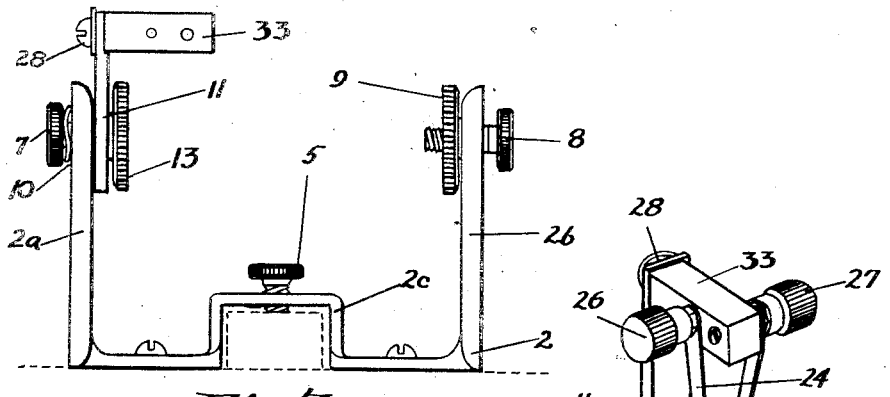
Fig. 3
Fig. 7
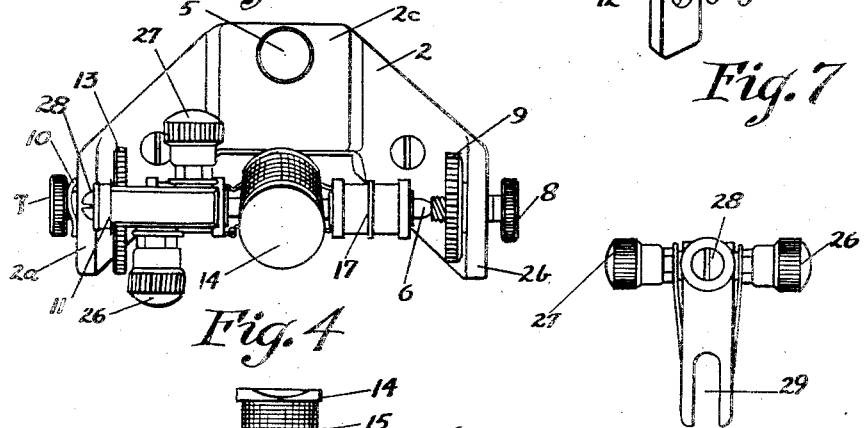
Fig. 4
Fig. 8
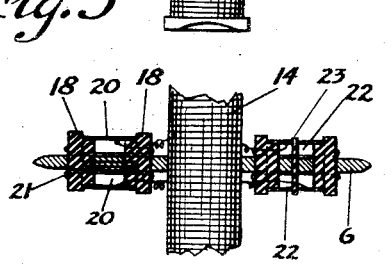
Fig. 5
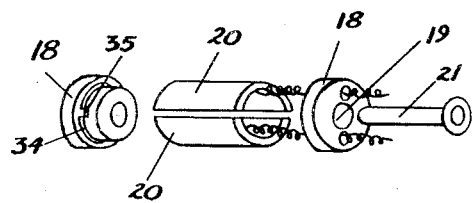
Fig. 9
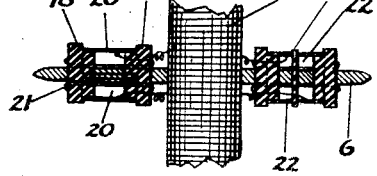
Fig. 6
INVENTOR
Ervin H Lewis
BY
ATTORNEY Patented Nov. 9, 1937

2,098,646

UNITED STATES PATENT OFFICE 2,098,646

EDUCATIONAL APPARATUS

Ervin Holbrook Lewis, Boston, Mass., assignor to Cambosco Scientific Company, Waverley, Mass., a corporation of Massachusetts Application August 8, 1935, Serial No. 35,240

16 Claims. (Cl. 35—19)

The present invention relates to an educational apparatus, and more especially to such an apparatus designed for the demonstration and teaching of the principles of electric motors and generators. The present invention provides an electric motor and generator by the use of which electric motor and generator principles may be demonstrated and taught.

Various types of electric motor and generator apparatus have heretofore been used to demonstrate the principles involved, but these have had serious drawbacks. Apparatus of this type must be constructed with such simplicity that its component parts can be readily seen by the student by inspection. It must be sufficiently sturdy so that it can be taken apart and reassembled easily and quickly by unskilled hands without damage. It should provide, with a minimum of parts, a demonstration of practically all types of electrical rotating machines. Furthermore, it is of great importance that such an apparatus have the ability to develop sensible amounts of mechanical power if a motor, and a readily demonstrable amount of electrical power if a generator. Finally, the device must be such as can be manufactured at a low cost.

The apparatus commonly available to and used by secondary and other schools for the demonstration and study of electric motor and generator principles up to the present time have been lacking in many of these essential features. It is the object of the present invention to provide an electrical motor and generator apparatus suitable for the demonstration and study of the fundamental features of simple electrical machines, such apparatus having all of the above mentioned desirable characteristics. Further objects of the present invention will appear from the description and the accompanying drawings.

Figure 1:
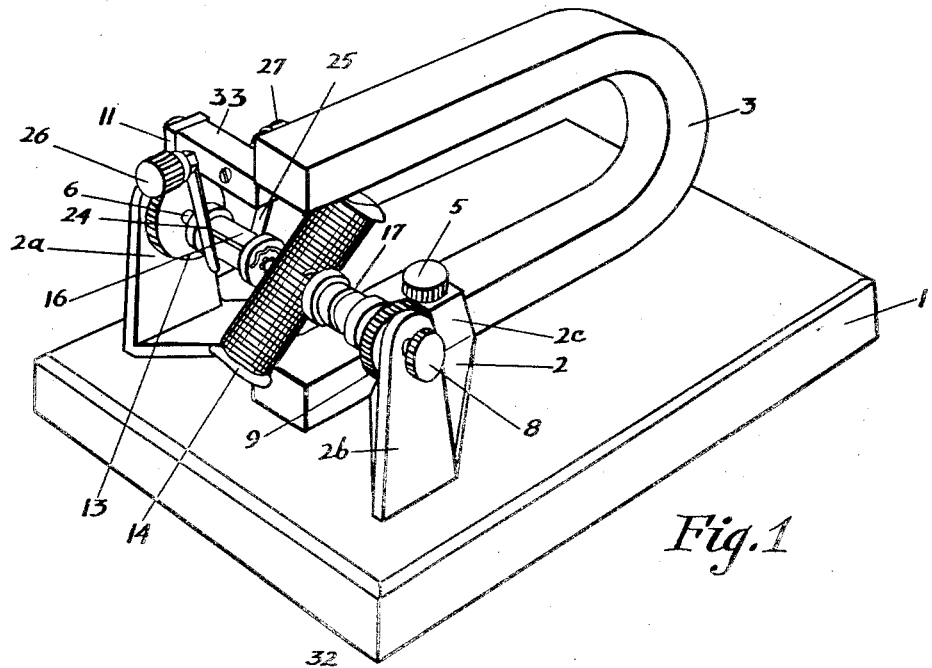
Figure 2:
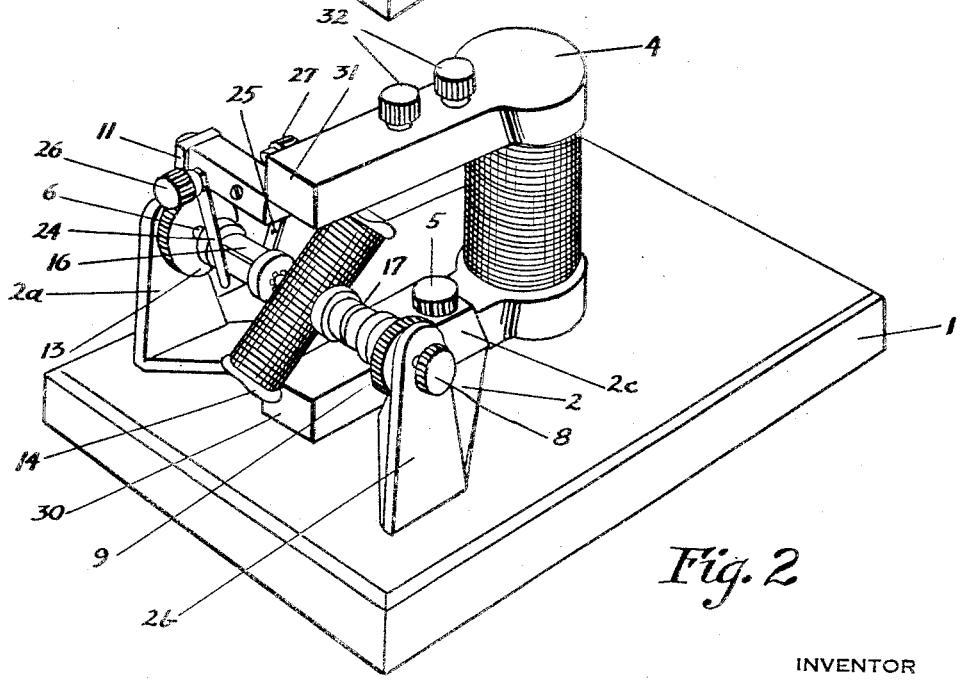

In the drawings Figure 1 shows a perspective view of the apparatus with a permanent magnet; Figure 2 shows a similar perspective view with an electromagnet in place of the permanent magnet; Figure 3 shows a front elevation of the supporting bracket for the armature, field magnet and brush assembly, with these elements removed; Figure 4 shows a plan view of the supporting bracket with the armature and brush assembly in place; Figures 5 and 6 show the armature shaft assembly, the former being a plan view while the latter is a section taken in median plane parallel to the plan of Figure 5; Figure 7 is a perspective view of the brush assembly; Figure 8 is an end view of a modification of Figure 7 and Figure 9 is an exploded perspective view of the commutator.

My apparatus for the demonstration of the principles of electric motors and generators can best be seen in assembled form in Figures 1 and 2. Upon a base 1, which may be made of any suitable nonmagnetic material, e. g. wood, is mounted a supporting bracket 2 which serves to hold in position all the various parts of the device. An end view and plan view of the bracket can be seen in Figures 3 and 4 respectively. It will be noted that the bracket is substantially U-shaped in the plane of the base, and is provided at its ends with parallel, perpendicularly upward extending arms 2a and 2b which support the armature shaft assembly, which is shown separately in Figure 5, and the brush holder assembly, shown in Figure 7. The middle portion of the bracket adjacent to the base is raised to form an inverted U-shaped channel 2c adapted to receive the field magnet which may be the U-shaped permanent magnet 3, shown in Figure 1, or the electro-magnet 4, shown in Figure 2.

The field magnet rests upon the base and is secured in position by the thumbscrew 5. Either magnet may thus be readily removed and the other substituted. By loosening the screw 5, the position of either magnet can easily be varied even while the device is running for study of the influence of position upon operation. It will be noted that throughout such variation the air-gap remains constant while the armature is within the arms of the magnet.

If desired, the supporting bracket and base may be made of a single piece of nonmagnetic material.

The ends of the armature shaft 6 are conical, forming pivots adapted to engage corresponding concave depressions in the bearing screws 7 and 8 which pass through threaded holes in the vertical arms 2a and 2b of the bracket 2. Bearing screw 8 is locked in position by means of lock nut 9, while bearing screw 7 is held in place by the lock washer 10. The bearing screw 7 also supports the brush holder assembly shown in Figure 7. That assembly is provided with a supporting arm 11, having at its lower end a hole 12 adapted to pass over the screw 7. By means of locknut 13, supporting arm 11 may be held at any desired angular position.

The armature shaft assembly shown in Figures 5 and 6 consists of an elongated iron core 14 wound with wire 15, centered and fixed transversely upon the shaft 6, thus forming two poles. The pole faces are rounded to decrease the air-gap to a minimum and to make it more uniform. A commutator 16 is mounted on the shaft on one side of the armature and a set of slip-rings 17 on the other side. These are suitably connected to the armature winding.

The commutator and slip-rings have a simple and inexpensive, but rugged and effective construction. As can be seen from Figures 6 and 9, the commutator is formed of two flanged discs 18 of insulating material having a central perforation 19. The conducting segments of the commutator are formed by two nearly hemi-cylindrical metallic members 20 which are held between the flanged members 18 by means of a tube 21 which may conveniently be a tubular rivet whose internal diameter is such that it will fit tightly over the shaft 6. If desired, grooves may be cut in the flanges of the members 18 close to the hubs into which the commutator segments may be fitted. These grooves may form a complete circle around the hub, but they are preferably made of the same arcuate length as that of the commutator segments as shown at 34 in Figure 9, thus serving to hold the segments apart and to prevent their rotation.

Assembly of the commutator is simply carried out by passing the connecting wires which have previously been soldered to the segments through small holes in one of the members 18, holding the latter with the segments 20 between them, passing the tubular rivet 21 through the holes in members 18 and upsetting the plain end of the rivet, thereby rigidly holding the whole assembly together.

The slip-rings are constructed in a similar manner. In place of the commutator segments, however, two rings 22, separated by an insulating washer 23 are used, as shown in Figure 6. The flanged members at the ends of the slip-rings may be just like those used for the commutator and if these have grooves of the same arcuate length as the commutator segments, the slip-rings 22 may be suitably notched to fit into the grooves thus preventing the rings from rotating when used as a pulley as mentioned below.

The commutator and slip-rings are mounted equidistant from their corresponding ends of the armature shaft 6 so that the armature shaft may be turned end for end to change from a direct current machine to an alternating current machine while using the same pair of brushes, and even without altering the position of the latter.

The brushes 24 and 25, which are made of strips of suitable conductive material, preferably phosphor bronze, are fastened to a strip of nonconducting material such as a phenolic condensation product by means of screws which also form the binding posts 26 and 27. The strip of nonconducting material is supported by the arm 11, to which it is fastened by the screw 28. The arm is mounted on one of the armature shaft bearing screws 8 as above mentioned so that the brushes contact the commutator or the slip-rings. The brushes are not opposite each other, but are offset in order that the same brushes can be used for both alternating and direct current operation.

The change from alternating to direct current operation can readily be made by loosening the lock nut 9 and the bearing screw until the armature can be removed. The armature is then turned end for end and put back into place. The bearing screw 7 remains fixed in position after initial assembly, whereby either the commutator or the slip-rings may be placed under the brushes without making any adjustment other than that of the bearing screw 8 and the lock nut 9.

As a modification, however, the brush supporting arm 11 may have its end bifurcated as shown at 29 in Figure 8. The entire brush assembly can then be removed from one side of the armature and placed on the other side by loosening the lock nuts. In this case it is desirable to provide an additional lock nut to hold the armature bearing screw 8 in place.

By loosening the lock nut 13, the angular position of the brushes can readily be varied to demonstrate the effect of change of brush position in a direct current machine. By virtue of the construction according to the present invention the variation of brush position can be made while the device is in operation and the best position can be determined by observation of the effects upon the operating characteristics of the machine. This feature is of great importance for educational purposes.

As previously mentioned, the assembly in Figure 1 shows a permanent magnet being used to provide the field flux. Since this is readily removable by loosening the thumb screw 5, an electromagnet 4 can easily and quickly be substituted as shown in Figure 2. The electromagnet 4 comprises a U-shaped core having pole faces 30 and 31, which have the same cross-sectional shape and size as that of the poles of the permanent magnet and of the channel portion 2c of the bracket 2. The central section of the magnet 4 is wound with wire whose ends are connected to the binding post terminals.

As shown assembled in Figures 1 and 2, my apparatus is in condition for operation as a direct current motor by supplying current to the brushes or as a generator by driving the armature mechanically by another motor or the like by using the slip-rings as a pulley. With the armature reversed, so that the slip-rings are under the brushes, alternating current motor and generator operation can be demonstrated. With the device running as an alternating current motor a pair of wires connected to a load such as a small lamp may be held against the commutator to demonstrate a rotary converter. Conversely, when the device is assembled as a direct current motor, the operation of an inverter can be shown.

Thus with the improved device of the present invention it is possible to demonstrate the principles of direct current motors and generators, alternating current motors and generators, rotary converters, inverters, etc. Furthermore, the commutator and slip-ring units are adapted alike by their sturdy construction and by their shape for use as pulleys. Through them mechanical power may be transmitted to or from the armature shaft. This construction facilitates belt connection to any suitable prime mover. It also permits belting two of these machines together so that one can drive the other. This makes it possible to demonstrate in a simple manner the operation of motor-generators. In fact substantially every fundamental principle and arrangement of simple rotating electric machinery can easily and clearly be demonstrated with the aid of the present invention.

In addition it will be evident to those skilled in the art that the advantageous features of my invention may also be applied to apparatus for demonstrating multipolar machines.

Having now described my invention, what I claim is:

1. An electric motor and generator device for educational purposes including a field magnet, an armature, a base and an armature supporting and field magnet positioning member secured to said base and having a substantially U-shaped portion in the plane of the base, said U-shaped portion carrying means for positioning said field magnet and said member having parallel arms extending perpendicularly to said plane, said arms being adapted rotatably to support said armature shaft parallel to said base.

2. In an electric motor and generator device for educational purposes having a plurality of different field magnets having arms of similar cross-sectional shape and size, the combination of armature means adapted to cooperate with any of said magnets and a single bracket means having a channel portion shaped to correspond to the cross-sectional shape of said magnets and adapted to engage an arm of any one of said magnets and to position the magnet in operative relation to said armature means.

3. An electric motor and generator device for educational purposes including a base, a bracket member having a portion substantially parallel to said base and secured thereto and at the extremities of said portion perpendicularly extending arms, an armature assembly rotatably supported by said arms, a field magnet and means for supporting it in operative relation to said armature including a channel portion formed in the portion of said bracket which is parallel to said base, said channel being shaped to correspond to the shape of said field magnet.

4. An electric motor and generator device for educational purposes including a base, a bracket member having a portion substantially parallel to said base and secured thereto and at the extremities of said portion perpendicularly extending arms, an armature assembly rotatably supported by said arms, a field magnet and means for supporting it in operative relation to said armature including a channel portion formed in the portion of said bracket which is parallel to said base, said channel being shaped to correspond to the shape of said field magnet and adapted to define in cooperation with said base an aperture adapted to receive one pole of said field magnet and means for firmly but removably holding said field magnet in position in said aperture.

5. An electric motor and generator device for educational purposes including a field magnet, an armature shaft assembly comprising a shaft member having an armature secured to the central portion thereof, a commutator secured to the shaft at one side of said armature and a slip-ring unit also secured to the shaft at the opposite side of said armature; a single bracket member for reversibly supporting said armature shaft in operative relation to said field magnet, and a single pair of brushes also supported by said bracket member and adapted to engage said commutator and said slip-rings.

6. An electric motor and generator for educational purposes comprising a rotatable armature, a field magnet adapted to cooperate therewith and means for securing the arms of said field magnet in the plane of rotation of said armature including means defining a unidirectional guideway adapted to engage the said magnet and thereby to position the same along a single line in the said plane.

7. An electric motor and generator for educational purposes comprising a rotatable armature, a field magnet adapted to cooperate therewith and means for securing the arms of said field magnet in the plane of rotation of said armature including means positioning said field magnet in said plane along a single line and manually controlled means for fixing the said magnet in desired positions along said line, whereby the distance between the armature and the magnet poles can be varied at will.

8. An electric motor and generator for educational purposes comprising a rotatable armature, a field magnet having two poles and adapted to cooperate with said armature and means for securing the arms of said field magnet in the plane of rotation of said armature including means positioning said field magnet in said plane along a single line perpendicular to the shortest line joining said magnet poles.

9. An electric motor and generator for educational purposes comprising a rotatable armature, a field magnet adapted to cooperate therewith and a single mounting member having means adapted rotatably to support said armature, means positioning the arms of said field magnet in the plane of rotation of said armature, said magnet being so mounted in said positioning means that it is free to move in said plane only, and manually controlled means for fixing the position of said field magnet in said plane.

10. An electric motor and generator for educational purposes comprising an armature having poles rotatable in a plane perpendicular to the armature axis, a field magnet having two poles adapted to cooperate with said armature and a single mounting member having means for supporting said armature and means for securing said field magnet against motion with respect to said armature in all directions except one in the plane of rotation of said armature poles and manually controlled means for fixing said magnet in any desired position in said one direction of motion.

11. An electric motor and generator for educational purposes comprising an armature having poles rotatable in a plane perpendicular to the armature axis, a field magnet having two poles adapted to cooperate with said armature and means for securing said field magnet against motion with respect to said armature in all directions except one in the plane of rotation of said armature poles and manually controlled means for fixing said magnet in any desired position in said one direction of motion.

12. An electric motor and generator for educational purposes including a supporting member made of a single piece and having a portion substantially U-shaped in one plane and having at the extremities of said portion arms extending perpendicularly to said plane, an armature assembly rotatably supported by said arms, a field magnet and means for supporting it in operative relation to said armature including a channel portion formed in the first-mentioned portion of said supporting member, said channel being shaped to correspond to the cross-section of said field magnet.

13. An electric motor and generator for educational purposes including a supporting member made of a single piece and having a portion substantially U-shaped in one plane and at the extremities of said portion arms extending perpendicularly to said plane, an armature assembly rotatably supported by said arms, a field magnet and means for supporting it in operative relation to said armature including a channel portion formed in the first-mentioned portion of said supporting member, said channel being shaped to correspond to the cross-section of said field magnet and thereby defining an aperture adapted to receive one pole of said field magnet and means for firmly but removably holding said field magnet in position in said aperture.

14. An electric motor and generator for educational purposes including a field magnet; an armature shaft assembly comprising a shaft member having an armature secured to the central portion thereof, a commutator secured to the shaft at one side of said armature and a slip-ring unit also secured to the shaft at the opposite side of said armature; a single bracket member for positioning said field magnet; means in said bracket member for rotatably supporting said armature assembly with the armature in operative relation to said field magnet; and a brush holder assembly supported by said armature supporting means and said bracket member and adapted to be positioned interchangeably at either side of said armature, whereby the brushes can be engaged with either said commutator or said slip-rings.

15. An electric motor and generator for educational purposes including a field magnet; an armature shaft assembly having secured to the shaft an armature element and commutator and slip-ring units of identical diameter on opposite sides of the armature respectively; a single bracket member adapted to position said field magnet and having a pair of parallel arms near whose extremities are mounted adjustable bearing screws for rotatably supporting the armature shaft with the armature element in operative relation to said field magnet, said screws being provided with lock nuts; and a brush holder assembly having a forked member adapted to fit over said bearing screws between said lock nuts and said arms.

16. An electric motor and generator for educational purposes including an armature having poles rotatable in a plane perpendicular to the armature axis, a field magnet having two poles adapted to cooperate with said armature and means for securing said field magnet in the plane of rotation of the armature, said securing means having a portion defining a channel shaped to correspond to the cross-section of one of the arms of said field magnet.

ERVIN H. LEWIS.